Dec. 20, 1932.  C. L. NORTON  1,891,479
COLORATION OF CONCRETE ARTICLES
Filed Nov. 15, 1930
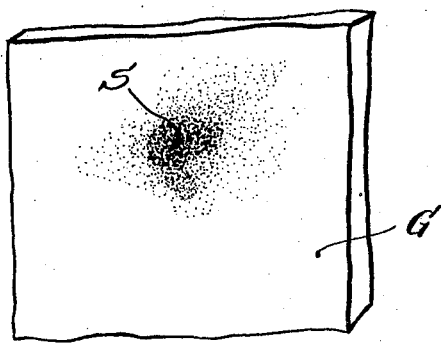
Inventor
Charles L. Norton
By Roberts Cushman & Woodbury
his Attorneys.

Patented Dec. 20, 1932

1,891,479

UNITED STATES PATENT OFFICE

CHARLES L. NORTON, OF BOSTON, MASSACHUSETTS

COLORATION OF CONCRETE ARTICLES

Application filed November 15, 1930. Serial No. 496,031.

My invention relates to the production of color-ornamented shaped concrete articles, and particularly to their ornamentation with fortuitously arranged patterns of contrasting colors which may be made to simulate colored marbles, and which therefore adapt such manufactured articles to interior structural decorative uses.

The drawing hereto annexed illustrates the manner in which particles of contrastingly colored concrete material mutually interpenetrate.

The basis of the concrete, to which selected pigments are added to give color, is a mixture of hydraulic cement and a hard aggregate, comminuted preferably to particle size of the same order as that of the cement. The term "hydraulic cement" is herein used to include any cement which will set under water; examples of such cements are, magnesium oxid, oxychlorids of magnesium, zinc, or calcium, calcined or dehydrated gypsum, the lime, silica, and alumina mixtures commercially known as Portland cement. Fine quartz sand, or powdered flint, may be used as the aggregate for mixture with the cement; since pigments are to be added to portions of the concrete material, a ground-mixture comprising a light colored hard aggregate is to be preferred. For this and other reasons the basic concrete mixture which I have found to be best adapted to the practice of this invention is hydraulic cement, such as Portland cement, and pulverized kaolin previously burned to a hard grog at temperatures approximating 3000° F.

Concrete articles comprising hydraulic cement and a hard aggregate of comminuted or pulverized quartz sand, flint, etc. will be found susceptible of receiving a high polish, but the use of hard-burned kaolin as the sole, or predominant ingredient associated with the cement, because of the quick setting of such concrete mixture, and also because of the unusually tenacious bond between the cement and kaolin in the final product, makes the product more amenable to polishing abrasion, which does not break the bond and remove aggregate particles as it is liable to do if other hard aggregates are employed.

The remarkable quick-setting property of a concrete mixture comprising hydraulic cement and hard-burned kaolin may be demonstrated as follows. Prepare for comparison mixtures of equal quantities of Portland cement and quartz sand, flint, or any other hard material (other than kaolin grog), and of equal mixtures of Portland cement and hard-burned kaolin (prepared as hereinbelow specified); grind each mixture, dry, in a ball mill until its particles are impalpably fine and practically unsusceptible of further dimensional reduction. In each mixture the cement and hard aggregate will be mutually and evenly distributed, so that every particle of each ingredient will have the same propinquity to particles of the other. Then make a water mixture of each pulverized solid mixture, using the quantity theoretically required for the setting of the cement therein, and cast each in a shallow tray, to equal depths. By the needle test, it will be determined that the cement-kaolin mixture starts its initial set in about two minutes, and is complete in ten minutes, whereas in the other mixtures, initial set is detected in from two to two and a half hours and completed in about five hours. If the mixture of hard burned kaolin and cement be comminuted to a fineness which would generally be considered impracticable, it will take its initial set in even shorter time than two minutes. This hard-burned kaolin apparently reacts chemically with the cement, because the setting time for this mixture is much shorter than that of mixtures comprising other hard aggregates. In fact, the hard-burned kaolin should not be reduced to particle sizes much below those which produce a powder which will all pass a hundred mesh screen, and contains particles no finer than 300 mesh, because a concrete mixture containing a substantial proportion of very fine particles will set so rapidly that the manufacture of concrete articles from it is difficult to regulate and control.

Furthermore, the physical structure of hard-burned kaolin particles is such that they bond with cement more tenaciously than particles of other hard material. Chemical reaction with the cement may contribute to this close bonding. Thus, a set concrete of cement and hard-burned kaolin particles presents a surface better adapted to polishing than concretes made with other hard fines, since the kaolin particles are much less likely to be dislodged and leave pits in the surface.

For illustration of my invention I take the case of a slab, plate, or tile as the article of manufacture to be powdered, and the mixture of hydraulic cement and hard-burned kaolin, in water, as the base-material.

The mixture should be rich in cement, equal quantities of cement and kaolin particles have been found suitable. If evaporation of surplus water is to be relied on to reduce the water proportion to the right value for initial setting, the mixture should be given enough water to form a fairly free-flowing cream. If the tile is to be formed in a filter press, the initial water proportion may be reduced, but in all cases should be large enough to permit internal flow of the several varicolored components.

If the natural color of the cement-kaolin mixture is to be used as the ground-color for the pattern (a pigmented mixture can of course be used for the predominant, or ground, color) and if the tile is to be made by what I will call the "open" method, the creamy mixture of water, cement and fine kaolin is first subjected to vacuum in order to extract the air which, adsorbed by the fine particles, would otherwise remain occluded in the mixture and produce voids of varying sizes in the finally set concrete, which should be homogeneously free from voids, solid and compact. The mold or plate on which the fluid tile material is cast should be such that evaporation of water shall be from the exposed surface of the material and not from its back. For thorough mixing, the hydraulic cement and kaolin grog should be ground together dry, as in a ball mill, until the mixture is reduced to a powder of particles of the proper average size. (The kaolin grog and its manufacture is described in the Harter and Kohler United States Patent No. 1,530,620, dated March 17, 1925.)

Similar cement-kaolin water mixtures, containing each a selected finely ground pigment material, are prepared in the same way. The mixture which is to supply the ground-color of the tile is first cast on the plate or mold, and the other mixtures, contrasting in color with the ground material are then poured in splashes or streaks more or less at random, and in greater or less quantity, as desired, upon the ground-layer. The plate or mold should be tipped slightly, this way and that, and tapped, so as to even the thickness and level the exposed surface, of the deposited fluid material. This agitation and tapping will produce fortuitous, irregular mutual distribution and marginal interpenetration of the severally colored ingredients, making cloudy or shadow effects. Thus, in the annexed drawing two concrete mixtures of contrasting colors are represented by G and S. The particles of which these mixtures are composed mutually interpenetrate, the particles of each mixture being separated by interspersion with those of the other. The drawing necessarily represents these particles on a much magnified scale. Obviously, though the same colored materials be used for several such tiles, no two can be identical in pattern. By varying the water-proportions of the several mixtures which are deposited on the ground-layer, different degrees of flow-distribution can be produced, the thicker mixtures forming relatively solid color spots, while the thinner mixtures form more elongate streaks.

In pursuing this open method, the surface of the fluid mixture should be watched; as the contained water evaporates a stage is reached when the glassy, highly reflective wet surface of the material fades out to a dull, or matte surface; this indicates that the moment of initial setting approaches, and that the water content has reached that critical proportion which, prior to initial set, will allow the material to be condensed by pressure. At this juncture, the contained water near the surface should be further reduced by application of a bibulous sheet, such as blotting paper. Then pressure is applied, preferably by passing a roller back and forth over the paper, or the paper may be removed and a roller, covered with similar bibulous material, used directly on the concrete material. Hand-pressure will suffice to compact the concrete so that when finally set it will be homogeneously dense, with, inevitably, a minor proportion of very fine particles. Thereupon the tile will be left for six or seven days in a moist atmosphere, to assume permanent set.

After setting permanently, the tile presents a dull, matte surface, on which the color pattern, due to the mutual distribution of varicolored concretes, is apparent. In order to develop the coloration in distinctness and brilliancy, as well as to render the tile surface non-retentive of dirt and readily cleanable with water and other usual household cleansing preparations, and resistant also to the abrasive effects of cleansing powders which are used both in cake form and as powder, it remains to polish the tile surface. Since cement is softer than the hard aggregate with which it is associated in the concrete, a hardening agent, such as a silico fluoride, is applied, before and during the polishing process which may employ carborundum powder and metal polishing discs, or carborundum discs. The tile surface is susceptible, when thus treated, of assuming a high polish; when polished, the surface colorations appear in full brilliancy.

If it be desired to apply a contrasting color in a regular pattern upon a ground-layer, either with or without the fortuitous color pattern of the character above described, a suitably colored concrete-mixture may be painted on the ground layer, or block-printed thereon, during the interval between the assumption of the dull or matte surface and the inception of initial set. Such applied patterns will stand in ridges above the ground surface and should be pressed even with it, as by pressure of a slightly oiled, smooth steel plate.

Fortuitous color patterns can be produced in another manner, namely, by preparing several concrete mixtures of the character above described, each with its selected pigment, and then mingling these mixtures in streaks, taking care not to stir or beat the mixture to color-homogeneity. This streaky concrete mixture is then poured on the plate or mold, and thereafter leveled, tapped, compacted, and set, in the manner above described.

Formation of an article, such as a tile, in a filter press, involves procedure broadly similar though different in detail. A ground-layer of the concrete mixture in fluid condition, is placed on the filter bed mold of a press. Colored concrete mixtures are then distributed over the surface of the ground-layer. Or, a streaky mixture of several differently colored preparations may be flowed or spread on the filter press.

The press being closed, slight inevitable irregularities in the surface of the wet concrete mixture, and local differences in the rate of expression of the water, will cause the material to flow internally; this flow distributes the colored matter spontaneously and fortuitously, the concrete mixture arrives at a consistency which may be described as damp, rather than wet, and then ceases to flow internally, is compacted, and after a very short time, takes its initial set. The tile is then removed from the press and allowed to take its permanent set, being kept for six or seven days in a moist atmosphere. Hardening and polishing involves the same procedure as that described with respect to tiles made by the open treatment.

If regular patterns are to be applied to a tile made by the press method, the press will be opened at the time when the tile material has become damp rather than wet, and before initial setting; the regular pattern is then applied, as to the tile made by the open process, and the press again closed to exert final pressure and at the same time level all portions of the tile material. The proper moment for thus opening the press will have to be determined by calculation supplemented by trial and observation.

I claim:

1. Concrete sheet material, comprising varicolored components of mixture of hydraulic cement and a hard aggregate, the latter comminuted to particle size of the same order as that of the cement particles, the varicolored components of said concrete being fortuitously distributed and the materials thereof mutually interpenetrating to form cloudy marginal color effects.

2. Concrete sheet material, comprising varicolored components of mixture of hydraulic cement and hard burned kaolin, the latter comminuted to particle size of the same order as that of the cement particles, the varicolored components of said concrete being fortuitously distributed and the materials thereof mutually interpenetrating to form cloudy marginal color effects.

3. Concrete sheet material, comprising varicolored components of mixture of hydraulic cement and a hard aggregate, the latter comminuted to particle size of the same order as that of the cement particles, the varicolored components of said concrete being fortuitously distributed and the materials thereof mutually interpenetrating to form cloudy marginal color effects, the surface of said concrete being highly polished.

4. Concrete sheet material, comprising varicolored components of mixture of hydraulic cement and hard burned kaolin, the latter comminuted to particle size of the same order as that of the cement particles, the varicolored components of said concrete being fortuitously distributed and the materials thereof mutually interpenetrating to form cloudy marginal color effects, the surface of said concrete being highly polished.

Signed by me at Cambridge, Massachusetts, this 13th day of November, 1930.

CHARLES L. NORTON.